US012614108B2

(12) United States Patent
Zhang

(10) Patent No.: US 12,614,108 B2
(45) Date of Patent: Apr. 28, 2026

(54) METHOD FOR RECOMMENDING INFORMATION, RECOMMENDATION SERVER, AND STORAGE MEDIUM

(71) Applicant: BIGO TECHNOLOGY PTE. LTD., Singapore (SG)

(72) Inventor: Yongchi Zhang, Guangzhou (CN)

(73) Assignee: BOE TECHNOLOGY PTE. LTD., Singapore (SG)

( * ) Notice: Subject to any disclaimer, the term of this patent is extended or adjusted under 35 U.S.C. 154(b) by 1036 days.

(21) Appl. No.: 17/772,925

(22) PCT Filed: Jul. 1, 2020

(86) PCT No.: PCT/CN2020/099662
§ 371 (c)(1),
(2) Date: Apr. 28, 2022

(87) PCT Pub. No.: WO2021/082500
PCT Pub. Date: May 6, 2021

(65) Prior Publication Data
US 2022/0405641 A1 Dec. 22, 2022

(30) Foreign Application Priority Data
Oct. 31, 2019 (CN) .......................... 201911053819.3

(51) Int. Cl.
*G06N 20/00* (2019.01)
(52) U.S. Cl.
CPC ................................... *G06N 20/00* (2019.01)

(58) Field of Classification Search
CPC ........................... G06N 20/00; G06F 16/9535
See application file for complete search history.

(56) References Cited

U.S. PATENT DOCUMENTS

2007/0081670 A1 4/2007 Topham et al.
2015/0286787 A1* 10/2015 Chen ...................... G16H 10/20
705/2
(Continued)

FOREIGN PATENT DOCUMENTS

CN 103310003 A 9/2013
CN 105160548 A 12/2015
(Continued)

OTHER PUBLICATIONS

Zhu, Michael, and Suyog Gupta. "To prune, or not to prune: exploring the efficacy of pruning for model compression." arXiv preprint arXiv:1710.01878 (2017). 11 pages (Year: 2017).*
(Continued)

*Primary Examiner* — Ann J Lo
(74) *Attorney, Agent, or Firm* — Kolitch Romano Dascenzo Gates LLP

(57) ABSTRACT

Provided is a method for recommending information. The method includes acquiring a click through rate of recommended information by predicting a feature vector of the recommended information by a recommendation model, wherein model parameters corresponding to features that are the same as features of the feature vector and have frequencies less than or equal to a first threshold are removed from the recommendation model; and issuing the recommended information based on the click through rate.

17 Claims, 7 Drawing Sheets

(56) References Cited

U.S. PATENT DOCUMENTS

| | | | | |
|---|---|---|---|---|
| 2015/0381552 | A1* | 12/2015 | Vijay | H04L 51/214 |
| | | | | 709/206 |
| 2018/0040029 | A1* | 2/2018 | Zeng | G06Q 30/0277 |
| 2018/0365521 | A1 | 12/2018 | Dai et al. | |
| 2019/0012387 | A1 | 1/2019 | Li et al. | |
| 2019/0042982 | A1* | 2/2019 | Qu | G06N 20/00 |
| 2019/0073590 | A1* | 3/2019 | Wu | G06N 3/045 |
| 2020/0272913 | A1* | 8/2020 | Yu | G06N 20/00 |
| 2020/0272933 | A1 | 8/2020 | Zhou | |
| 2020/0334524 | A1* | 10/2020 | Sprague | H04L 67/12 |

FOREIGN PATENT DOCUMENTS

| | | | | |
|---|---|---|---|---|
| CN | 107045511 | A | 8/2017 | |
| CN | 107122327 | A | 9/2017 | |
| CN | 107203891 | A | 9/2017 | |
| CN | 107515909 | A | 12/2017 | |
| CN | 107798332 | A | 3/2018 | |
| CN | 107944589 | A | 4/2018 | |
| CN | 108960264 | A | 12/2018 | |
| CN | 108965951 | A | 12/2018 | |
| CN | 109299740 | A | 2/2019 | |
| CN | 109299994 | A | 2/2019 | |
| CN | 109345302 | A | 2/2019 | |
| CN | 109582903 | A | 4/2019 | |
| CN | 109992710 | A | 7/2019 | |
| CN | 110008399 | A | 7/2019 | |
| CN | 110321422 | A | 10/2019 | |
| CN | 110378434 | A | 10/2019 | |
| CN | 110825966 | A | 2/2020 | |
| EP | 3506185 | A1 | 7/2019 | |
| TW | 201543394 | A * | 11/2015 | G06Q 30/0246 |

OTHER PUBLICATIONS

International Search Report of the International Searching Authority for State Intellectual Property Office of the People's Republic of China in PCT application No. PCT/CN2020/ 099662 issued on Aug. 28, 2020, which is an International application corresponding to this U.S. application.

The State Intellectual Property Office of People's Republic of China, First Office Action in Patent Application No. CN201911053819.3 issued on Mar. 15, 2021, which is a foreign counterpart application corresponding to this U.S. Patent Application, to which this application claims priority.

The State Intellectual Property Office of People's Republic of China, Second Office Action in Patent Application No. CN201911053819.3 issued on May 19, 2021, which is a foreign counterpart application corresponding to this U.S. Patent Application, to which this application claims priority.

The State Intellectual Property Office of People's Republic of China, Third Office Action in Patent Application No. CN201911053819.3 issued on Aug. 27, 2021, which is a foreign counterpart application corresponding to this U.S. Patent Application, to which this application claims priority.

Notification to Grant Patent Right for Invention 201911053819.3 issued on Jan. 24, 2022, to which this application claims priority.

Chen, Qiaohong, et al.; "Research on Estimation of Ads Click Rate Based on Recurrent Neural Network", Journal of Zhejiang Sci-Tech University (Natural Sciences), vol. 35, No. 6, Nov. 2016, pp. 880-885, English translation of abstract provided.

Yu, Shimin; "Prediction of ads click through rate based on recurrent neural network", China Master's Theses Full-text Database,Economic and Management Science Album, Jul. 15, 2016, pp. J157-J158.

Extended European Search Report Communication Pursuant to Rule 62 EPC, dated Nov. 22, 2022 in Patent Application No. EP 20882554.7, which is a foreign counterpart application of this US application.

Madani, Omid, et al.; "Contextual Recommender Problems [Extended Abstract]"; Utility-Based Data Mining, ACM, 2 Pennplaza, Suite 701 New York NY 10121-0701USA, pp. 86-89, abstract, p. 87-p. 88, Aug. 21, 2005.

* cited by examiner

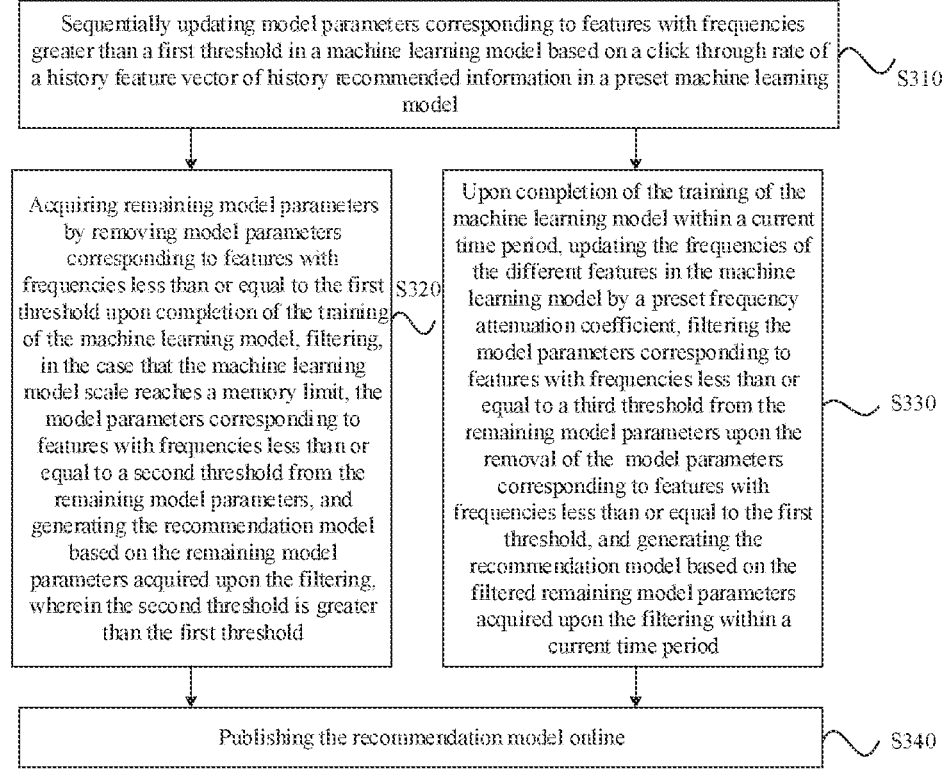

Sequentially updating model parameters corresponding to features with frequencies greater than a first threshold in a machine learning model based on a click through rate of a history feature vector of history recommended information in a preset machine learning model          S310

Acquiring remaining model parameters by removing model parameters corresponding to features with frequencies less than or equal to the first threshold upon completion of the training of the machine learning model, filtering, in the case that the machine learning model scale reaches a memory limit, the model parameters corresponding to features with frequencies less than or equal to a second threshold from the remaining model parameters, and generating the recommendation model based on the remaining model parameters acquired upon the filtering, wherein the second threshold is greater than the first threshold          S320

Upon completion of the training of the machine learning model within a current time period, updating the frequencies of the different features in the machine learning model by a preset frequency attenuation coefficient, filtering the model parameters corresponding to features with frequencies less than or equal to a third threshold from the remaining model parameters upon the removal of the model parameters corresponding to features with frequencies less than or equal to the first threshold, and generating the recommendation model based on the filtered remaining model parameters acquired upon the filtering within a current time period          S330

Publishing the recommendation model online          S340

FIG. 3A

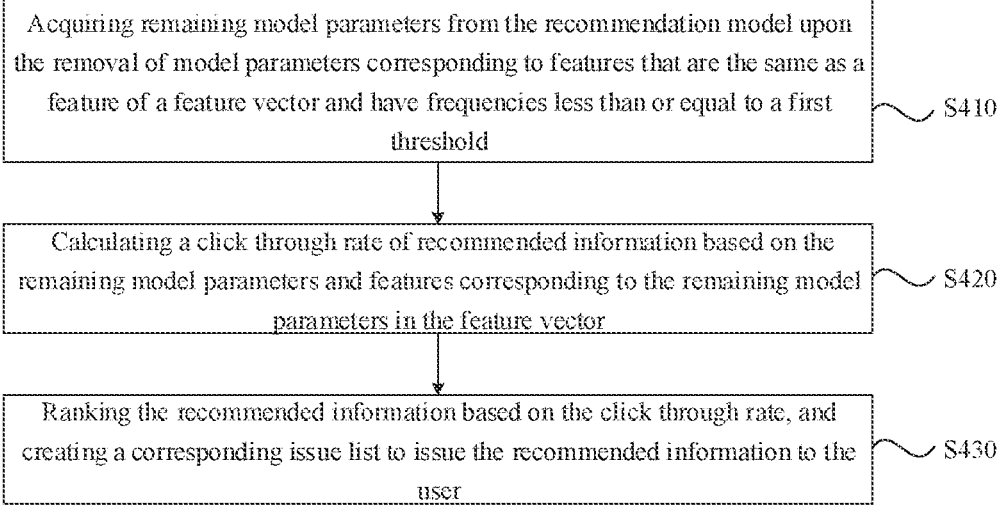

Acquiring remaining model parameters from the recommendation model upon the removal of model parameters corresponding to features that are the same as a feature of a feature vector and have frequencies less than or equal to a first threshold          S410

Calculating a click through rate of recommended information based on the remaining model parameters and features corresponding to the remaining model parameters in the feature vector          S420

Ranking the recommended information based on the click through rate, and creating a corresponding issue list to issue the recommended information to the user          S430

FIG. 4

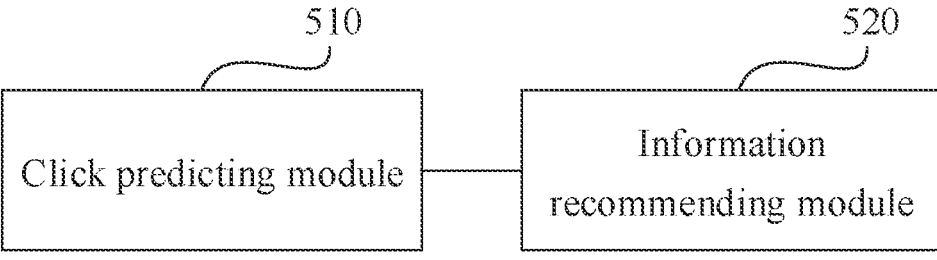

510

520

Click predicting module

Information recommending module

FIG. 5

METHOD FOR RECOMMENDING INFORMATION, RECOMMENDATION SERVER, AND STORAGE MEDIUM

CROSS-REFERENCE TO RELATED DISCLOSURE

This application is a US national stage of international application No. PCT/CN2020/099662, filed on Jul. 1, 2020, which claims priority to the Chinese Patent Application No. 201911053819.3, filed on Oct. 31, 2019, the contents of which are herein incorporated by reference in their entireties.

TECHNICAL FIELD

The present disclosure relates to the field of machine learning technologies, and in particular, relates to a method for recommending information, and a recommendation server and a storage medium thereof.

BACKGROUND

With the rapid development of artificial intelligence interaction technologies, pre-trained machine learning models have been widely used in large data scenarios of service types, for example, recommendation, searching, advertisement, and the like. For the search needs of the user, the backend may acquire a plurality of relevant recommended information. In this case, the click through rate (CTR) of the plurality of recommended information needs to be predicted, so as to push the optimal information for the user based on the click through rate of the plurality of recommended information.

Conventionally, a service prediction model most fitting click behaviors of users on recommended information is trained by the logistic regress algorithm, and the service prediction model includes model weight coefficients in each feature dimension in the recommended information. When predicting the click through rate of each recommended information, the feature values in each feature dimension and the corresponding model weight coefficients in the recommended information are necessary to look up.

SUMMARY

Embodiments of the present disclosure provide a method and apparatus for recommending information, and a recommendation server and a storage medium thereof.

In a first aspect, the embodiments of the present disclosure provide a method for recommending information. The method includes:

acquiring a click through rate of recommended information by predicting a feature vector of the recommended information by a recommendation model, wherein model parameters corresponding to features that are the same as features of the feature vector and have frequencies less than or equal to a first threshold are removed from the recommendation model; and issuing the recommended information based on the click through rate.

In a second aspect, the embodiments of the present disclosure provide an apparatus for information recommendation. The apparatus includes:

a click predicting module, configured to acquire a click through rate of recommended information by predicting a feature vector of the recommended information by a recommendation model, wherein model parameters corresponding to features that are the same as features of the feature vector and have frequencies less than or equal to a first threshold are removed from the recommendation model; and an information recommending module, configured to issue the recommended information based on the click through rate.

In a third aspect, the embodiments of the present disclosure provide a recommendation server. The recommendation server includes:

at least one processor; and a memory configured to store the at least one program;

wherein the at least one program, when loaded and run by the at least one processor, causes the at least one processor to perform the method for recommending information according to any embodiment of the present disclosure.

In a fourth aspect, the embodiments of the present disclosure provide a system for training a model. The system includes: a training server cluster and a parameter server cluster; wherein the parameter server cluster is configured to store model parameters corresponding to different features in a preset machine learning model;

the training server cluster is configured to sequentially acquire latest model parameters corresponding to different features in the machine learning model from the parameter server cluster, acquire a corresponding click through rate by processing a history feature vector of history recommended information based on the model parameter, calculate a loss coefficient of model parameters corresponding to features with frequencies greater than a first threshold in the machine learning model, and return the loss coefficient to the parameter server cluster; and the parameter server cluster is further configured to update the corresponding model parameters by the loss coefficient and feed the updated model parameters back to the training server cluster, remove model parameters corresponding to features with frequencies less than or equal to the first threshold upon completion of the training of the machine learning model, acquire remaining model parameters, and generate a corresponding recommendation model based on the remaining model parameters.

In a fifth aspect, the embodiments of the present disclosure provide a computer-readable storage medium. The computer-readable storage medium stores a computer program; wherein the computer program, when loaded and run by a processor, causes the processor to perform the method for recommending information according to any embodiment of the present disclosure.

BRIEF DESCRIPTION OF THE DRAWINGS

FIG. 3A is a flowchart of training a recommendation model in another method for recommending information according to an embodiment of the present disclosure;

FIG. 4 is a flowchart of another method for recommending information according to an embodiment of the present disclosure;

FIG. 5 is a schematic structural diagram of an apparatus for recommending information according to an embodiment of the present disclosure;

DETAILED DESCRIPTION

Figure 1A:
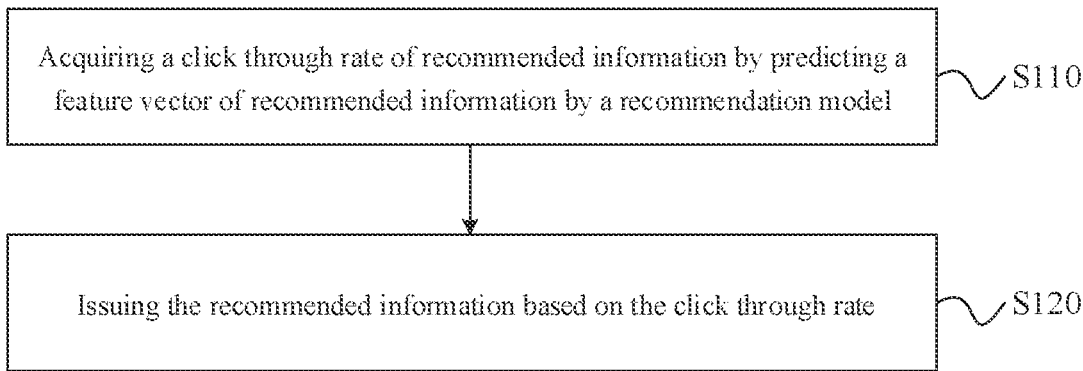
FIG. 1A is a flowchart of a method for recommending information according to an embodiment of the present disclosure.

FIG. 1A is a flowchart of a method for recommending information according to an embodiment of the present disclosure, and the embodiment may be applicable to any of a backend recommendation server that may provide a user with an issue request service for relevant recommended information. The technical solutions in the embodiment of the present disclosure are applicable in a case of recommending relevant information to a user. The method for recommending information according to the embodiments may be performed by an apparatus for recommending information according to the embodiments. The apparatus May be implemented by software and/or hardware and integrated in a recommendation server for performing the method.

Referring to FIG. 1A, the method may include processes S110 to S120.

In S110, a click through rate of recommended information is acquired by predicting a feature vector of the recommended information by a recommendation model.

The push information is a large amount of recommended information corresponding to a current issue request and is looked up by the push server based on a received issue from a client and history behavior data of the user through an object recommendation itemCF algorithm, a user recommendation userCF algorithm, a content recommendation content-based algorithm, or a service recommendation vector-base algorithm, or the like in the related art.

Illustratively, in the case that the user requires the recommendation server to recommend the corresponding relevant information, the issue request is an instruction of the request correspondingly generated by performing a corresponding content refresh operation or a lookup operation for the information on the client. In the case that the issue request does not include specific request content, news, information, music, or short video and other content of interest to the user may be determined by analyzing history behavior data of the user, so as to look up corresponding data content as the recommended information corresponding to the request. The request method is generally directed to the case that the user does not determine the requires specific information when performing the content refresh operation in a corresponding software product on the client. In this case, by analyzing the corresponding recommended information based on the history behavior data, quality information is recommended to the user in the case that the issue request includes specific request content, news, information, music, or short video and other content associated with the specific content of the request may be looked up by analyzing the specific content of the request, and looked up associated information acts as the corresponding recommended information of the request. The request method is generally directed to the case where the user performs the lookup operation of the associated information in a corresponding software product on the client. In this case, the corresponding push information is determined based on specific content of the request, and hence, matched information is recommended to the user.

A feature vector of the recommended information refers to feature data in different dimensions that are analyzed based on various features of the recommended information. For example, where a video is analyzed in the aspects of "like," "forward," and "comment," results in these three aspects may constitute a three-dimensional feature vector of the video.

In addition, the recommendation model is a pre-trained network model configured to quickly filter the most matching recommended information for the user, and the pre-training is a training of a click behavior of the user on each history recommended information for the feature vector corresponding to each history recommended information in the training in the related art, the preset model parameters corresponding to the features in the network model that are the same as the features in the feature vector corresponding to the recommended information are consecutively updated, such that the trained network model includes the model parameters corresponding to the features in the feature vector corresponding to the recommended information to analyze the features in the feature vector. In the recommendation scenario such as searching, personalized pushing service, advertisement notification, the recommended information includes a large number of different types of features, such that the trained network model further includes model parameters corresponding to a large number of different types of features, and the memory is excessively occupied. In addition, when predicting a click behavior of the user for the recommended information, a longer time may be spent on looking up the model parameters corresponding to the features from a large number of model parameters, thereby reducing the efficiency of the model operation.

Figure 1B:
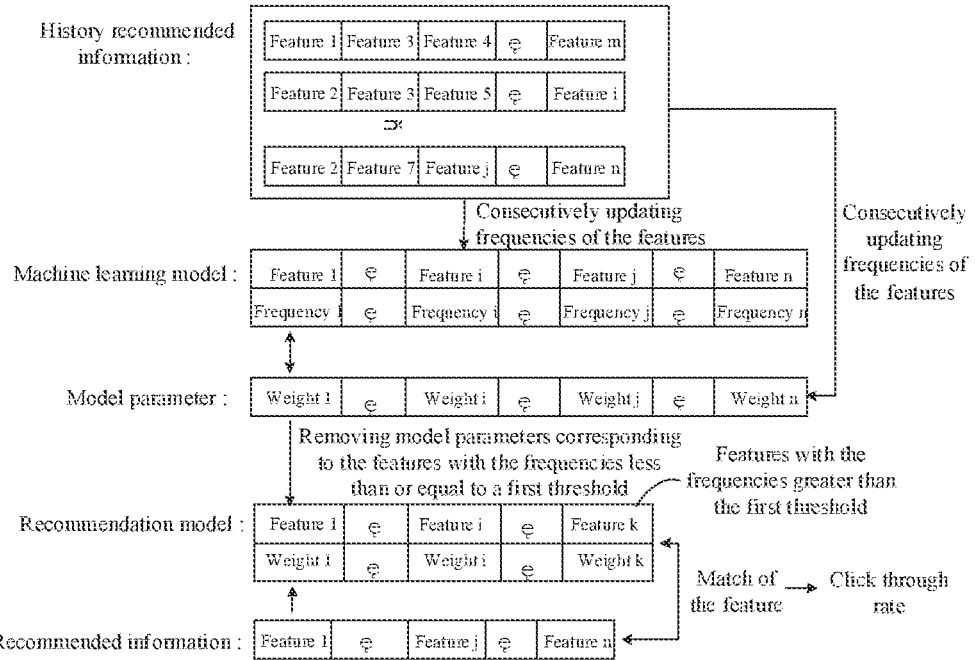
FIG. 1B is a schematic diagram of a principle of an information recommendation process according to an embodiment of the present disclosure.

In this embodiment, considering that the feature vector of the recommended information may include a large number of high-dimensional sparse features, such as ID of the user, anchor ID, or device ID, and the like, the click behavior of the user on the different recommended information may be not affected in the case that such high-dimensional sparse features are rarely participated in the training process of the click behavior of the user on the recommended information. Therefore, in the model training process, as shown in FIG. 1B, the training of such features in the feature vector of the history recommended information may be excluded, and the training of the features that have a greater effect on the click behavior of the user may be remained, such that the trained recommendation model is merely remained the model parameters corresponding to the features that exert a great effect on the click behavior of the user. In the embodiments, the times of occurrences of each feature in the network model (the frequency of the feature in the embodiments) may be determined based on the feature vector of the history recommended information in the model training process, and the times of occurrences represent the effect of the features on the click behavior of the user. Therefore, the model parameters corresponding to the features that are the same as the features of the feature vector and have the frequencies less than or equal to a first threshold are removed from the trained recommendation model in the embodiments, and only the model parameters corresponding to the features with the frequencies greater than the first threshold are remained in the trained recommendation model. In this way, the size of the recommendation model is decreased, and the occupied memory of the model parameters in the recommendation model is reduced, illustratively, the model parameters in the recommendation model in the embodiments may be weight coefficients corresponding to different features in the recommendation model, wherein the weight coefficient is configured to represent the effect of each feature on the click behavior of the user.

In this case, the click through rate of the recommended information refers to a click arrival rate of the recommended information that is filtered from all recommended information, recommended to the client of the user, and clicked and view by the user. That is, the actual number of clicks on the recommended information is divided by the total amount of the recommended information, and thus the quality of each recommended information issued to the user is determined.

Illustratively, the user performs the corresponding content refresh operation or the lookup operation on the information on the client, so as to generate the corresponding issue request and send the corresponding issue request to the recommendation server. The recommendation server looks up a large amount of recommended information corresponding to the issue request by a similarity algorithm in the related art based on the history behavior data of the user, and acquires a corresponding feature vector from a feature service storing the different types of the features of the upload information based on the identification information of each recommended information, and hence inputs the feature vector of each recommended information into the pre-trained recommendation model of the embodiments. Furthermore, the corresponding features in the feature vector of the recommended information are analyzed based on the model parameters corresponding to the features that are remained in the recommendation model and have frequencies greater than the first threshold, such that the click through rate of the acquired recommended information is predicted.

In S120, the recommended information is issued based on the click through rate.

Illustratively, upon acquisition of the click through rate of each recommended information, the preference of the user for each recommended information may be determined explicitly, and the corresponding recommended information is filtered from all recommended information based on the issue request and the click through rate of the user and is issued to the user. Illustratively, the recommended information with the highest click through rate is issued to the user in the case that the user is currently required to acquire the optimal piece of information, and a plurality of recommended information with the top click through rate is issued to the user in the case that the user is required to acquire the plurality of recommended information at one-time.

In the technical solution according to this embodiment, in the process of training the recommendation model, the model parameters corresponding to features that are the same as the features in the feature vector of the recommended information and have the frequencies less than or equal to the first threshold are removed, and the model parameters corresponding to the features with the frequencies greater than the first threshold are remained, thereby reducing the size of the recommendation model and the occupied memory of the model parameters in the recommendation model. In addition, in the case that the feature vector of the recommended information is predicted based on the model parameters in the recommendation model, it is unnecessary to look up all the model parameters that correspond to the features in the feature vector, thereby reducing the time spent in the lookup process. The features in the feature vector of the recommended information that correspond to the model parameters remained in the recommendation model are analyzed. In this way, the efficiency of information recommendation is improved while the accuracy is ensured.

Figure 2A:
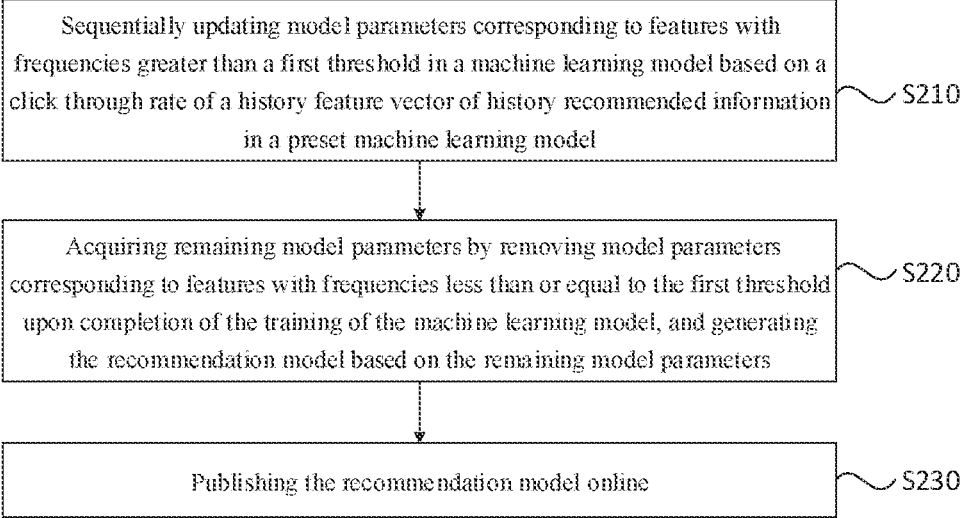
FIG. 2A is a flowchart of training a recommendation model in a method for recommending information according to an embodiment of the present disclosure.
Figure 2B:
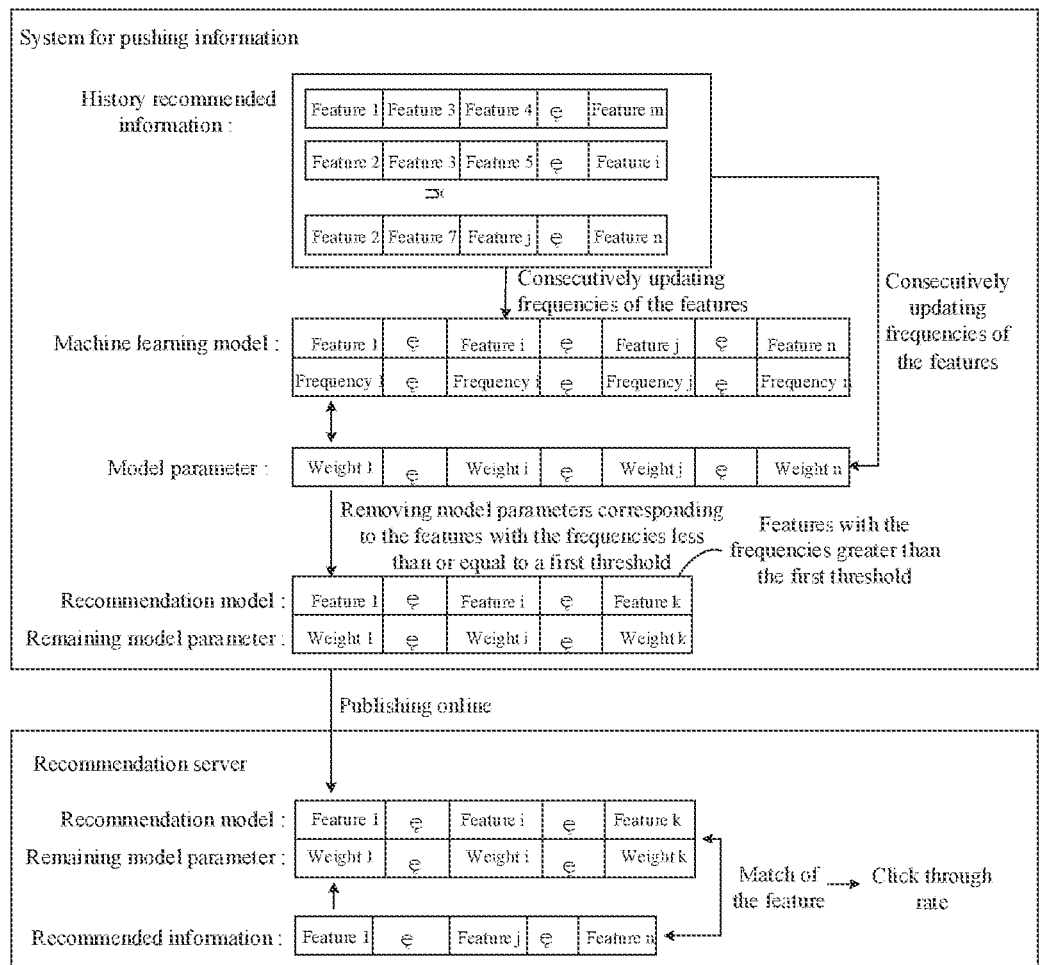
FIG. 2B is a schematic diagram of a principle of a process of training recommendation model according to an embodiment of the present disclosure.

FIG. 2A is a flowchart of training a recommendation model in a method for recommending information according to an embodiment of the present disclosure, and FIG. 2B is a schematic diagram of a principle of a process of training recommendation model according to an embodiment of the present disclosure. The embodiments are refined based on the embodiments described above. The training of the recommendation model in the embodiments may be performed offline, and the processes of the offline training of the recommendation model and predicting the click through rate of each recommended information with the trained recommendation model online may be implemented on different devices, such that the recommendation model may be trained by a pre-architecture model training system in the embodiments. Upon completion of the training, the recommendation model is issued to the recommendation server to online perform the method for recommending information according to any one of the embodiments of the present disclosure. Detailed explanations are made in this embodiment to describe the process of offline training the recommendation model.

As shown in FIG. 2A, this embodiment includes processes S210 to S230.

In S210, the model parameters corresponding to the features with the frequencies greater than the first threshold in a machine learning model are sequentially updated based on the click through rate of a history feature vector of the history recommended information in the preset machine learning model.

Prior to training the recommendation model, the machine learning model is pre-architecture, and initial values of corresponding model parameters are preset for each feature of different types in the machine learning model. By prediction errors of click through rates of a large number of history recommended information of different types, the model parameters corresponding to the features in the machine learning model are sequentially revised until the click through rate of any type history recommended information can be accurately predicted.

Illustratively, a large amount of history recommended information of different types are acquired to accurately analyze click behaviors of the user for different types of information, thereby determining the preference of the user. A plurality of history feature vectors of the history recommended information are input into a preset machine learning model, and the corresponding features in the history feature vector are analyzed based on the preset current model parameters in the machine learning model, thereby acquiring a click through rate of each history recommended information. The prediction error in the machine learning model under current model parameters is predicted by comparing a history tag and a click through rate of the history recommended information. Simultaneously, the number of occurrences each feature in the machine learning model, i.e., the frequencies of the features in this embodiment, are determined based on the features in the feature vector of the history recommended information, and the prediction error is back-propagated in the machine learning model to modify the selected model parameters corresponding to the features with the frequencies greater than the first threshold in the machine learning model, to improve the accuracy of the prediction result subsequently.

Illustratively, as shown in FIG. 2B, sequentially updating the model parameters corresponding to the features with the frequencies greater than the first threshold in a machine learning model based on the click through rate of a history feature vector of the history recommended information in the preset machine learning model in the embodiments may include: acquiring the corresponding current click through rate by predicting the history feature vector of the current history recommended information by the machine learning model; calculating, by a preset loss function, a loss coefficient of the current click through rate under the model parameters corresponding to the features with the frequencies greater than the first threshold, modifying the corresponding model parameters in the machine learning model by the loss coefficient, predicting the history feature vector of the next history recommended information by the machine learning model, and modifying the model parameters corresponding to the features with the frequencies less than the first threshold in the machine learning model until training of the machine learning model is completed.

Illustratively, the history feature vector of the current history recommended information is input into the preset machine learning model, the corresponding features in the history feature vector of the current history recommended information is analyzed based on the current model parameter, and the current click through rate of the current history recommended information is acquired. The frequencies of the features in the machine learning model are analyzed based on the features in the history feature vector of the history recommended information, thereby marking the model parameters corresponding to the features with the frequencies greater than the first threshold. The loss coefficient, that is, the difference value of the model parameters capable of accurately analyzing the click through rate of the history recommended information, under the model parameters corresponding to the features with the frequencies greater than the first threshold in the machine learning model is determined by the preset loss function, and the corresponding model parameters in the machine learning model are modified by the loss coefficient. After modifying, the history feature vector of the next history recommended information is acquired, and is input into the modified machine learning model. The features corresponding to the model parameters in the history feature vector of the next history recommended information are analyzed based on the modified model parameters (the model parameters corresponding to the features with the frequencies greater than the first threshold) in the machine learning model, the features with the frequencies less than or equal to the first threshold are excluded, thereby acquiring the next click through rate of the next history recommended information. The model parameters corresponding to the features with the frequencies greater than the first threshold in the machine learning model are modified consecutively. The processes are sequentially cycled until the prediction error of the click through rate of the history recommended information is less than the preset error threshold, and the training of the machine learning model is completed.

In S220, the remaining model parameters are acquired by removing model parameters corresponding to features with frequencies less than or equal to the first threshold upon completion of the training of the machine learning model, and the recommendation model is generated based on the remaining model parameters.

The remaining model parameters are the model parameters corresponding to features with the frequencies less than the first threshold in the machine learning model.

Illustratively, as the features with the frequencies less than or equal to the first threshold in the machine learning model contribute little to predicting the click behavior of the user, considering that the efficiency of the recommendation model, upon completion of the training of the machine learning model in this embodiment, the model parameters corresponding to the features with the frequencies less than or equal to the first threshold in the machine learning model may be removed directly based on the markings on the model parameters corresponding to the features with the frequencies greater than the first threshold in the model training process, which does not affect the predicted result of the click through rate of the recommended information. The corresponding recommendation model is generated based on the remaining model parameters upon the removal of the model parameters corresponding to the features with the frequencies less than or equal to the first threshold (the model parameters corresponding to the features with the frequencies greater than the first threshold in the machine learning model), such that the recommendation model is merely remained the model parameters corresponding to the features with the frequencies less than the first threshold, thereby reducing the size of the recommendation model and improving the efficiency of the recommendation model on the premise of ensuring the accuracy of the recommendation.

Furthermore, in order to accurately determine the model parameters corresponding to the features with the frequencies less than or equal to the first threshold in the machine learning model, upon sequentially updating the model parameters corresponding to the features with the frequencies greater than the first threshold in the machine learning model, the embodiment further includes: setting the model parameters corresponding to the features with the frequencies less than or equal to the first threshold in the machine learning model as preset sparsity values to remove the preset sparsity values and acquire the remaining model parameters upon completion of the training of the machine learning model.

Illustratively, in the process of training the model, the preset frequencies of the features in the machine learning model may be determined from the features in the history feature vector in the process of inputting of the history feature vector of each history recommended information into the machine learning model. In this case, the model parameters corresponding to the features with the frequencies less than the first threshold are modified, and the model parameters corresponding to the features with the frequencies less than or equal to the first threshold are set as the preset sparsity values (the preset sparsity values are 0s in the embodiment) as the model parameters corresponding to the features with the frequencies less than or equal to the first threshold are no longer participated in the learning training. The model parameters set as the preset sparsity values are directly removed upon completion of the training on the machine learning model, thereby remaining the model parameters corresponding to the features with the frequencies greater than the first threshold.

Illustratively, in this embodiment, an improved follow-the-regularized-leader (FTRL) algorithm is configured in the machine learning model, and the model parameters corresponding to the features with the frequencies greater than the first threshold are modified sequentially through the improved FURL algorithm in the process of training the model. The FTRL algorithm in the related art is as follows:

$$\begin{cases} z = z + g - w\left(\sqrt{n + g^2} - \sqrt{n}\right)/\alpha \\ n = n + g^2 \\ w = \begin{cases} 0; |z| \le \lambda_1 \\ -(z - \mathrm{sgn}(z)\lambda_1)/\left(\dfrac{\beta + \sqrt{n_i}}{\alpha} + \lambda_2\right); \text{otherwise} \end{cases} \end{cases} ;$$

In the above algorithm, g represents a loss coefficient of a model parameter corresponding to a feature, z and a represent intermediate variables of a machine learning model in the training process, w represents the model parameter corresponding to the feature, and $\alpha$, $\beta$, $\lambda_1$, and $\lambda_2$ represent defined parameters of sparsity training.

In this embodiment, the frequencies of the features in the machine learning model are defined based on the FTRL algorithm described above, and the improved Flat, algorithm is as follows:

$$\begin{cases} f = f + 1 \\ z = \begin{cases} 0; f \le \lambda_3 \\ z + g - w\left(\sqrt{n + g^2} - \sqrt{n}\right)/\alpha; \text{otherwise} \end{cases} \\ n = \begin{cases} 0; f \le \lambda_3 \\ n + g^2; \text{otherwise} \end{cases} \\ w = \begin{cases} 0; f \le \lambda_3 \text{ or } |z| \le \lambda_1 \\ -(z - \mathrm{sgn}(z)\lambda_1)/\left(\dfrac{\beta + \sqrt{n_i}}{\alpha} + \lambda_2\right); \text{otherwise} \end{cases} \end{cases} ;$$

In the above algorithm, $f$ represents a frequency a feature in a machine learning model, and $\lambda_3$ represents a first threshold defined by the frequency of the feature; conventional training is still performed on the model parameters corresponding to the features with the frequencies less than the first threshold in the machine learning model through the improved FTRL, algorithm, and the model parameters corresponding to the features with the frequencies less than or equal to the first threshold are directly sets as 0, which may not participate in a subsequent machine learning process. That is, in the process of training the machine learning model, the preset frequencies of the features in the machine learning model are determined based on the history feature vector of the history recommended information, machine learning model parameters corresponding to the features are trained in the case that the frequencies of the features are greater than the first threshold. Otherwise, the model parameters corresponding to the features are always set as 0. Upon completion of the training on the machine learning model, a corresponding recommendation model is generated based on the model parameters other than 0, which reduces the size of the recommendation model and improves the efficiency of the recommendation model on the premise of the accuracy of the recommendation.

In S230, the recommendation model is published online.

Illustratively, upon generation of the corresponding recommendation model, the recommendation model may be directly published online. That is, the recommendation model is applied in a recommendation server of the method for recommending information in any one of the embodiments of the present disclosure, so as to directly predict the click through rate of each recommended information by the recommendation model online, recommend more interesting content for the user, and improve the accuracy and efficiency of the information recommendation.

In the technical solution according to this embodiment, the model parameters corresponding to the features with the frequencies less than the first threshold in the machine learning model are consecutively updated based on the click through rate of the history recommended information predicted by the machine learning model, the model parameters corresponding to the features with the frequencies less than or equal to the first threshold are removed upon completion of the training of the machine learning model, and the corresponding recommendation model is generated based on the remaining model parameters. The model parameters corresponding to the features with the frequencies less than or equal to the first threshold are not required to be modified each time, thereby improving efficiency of training the model, reducing the size of the recommendation model, and reducing occupied memory of the model parameters and the high-dimensional sparse feature.

Figure 3B:
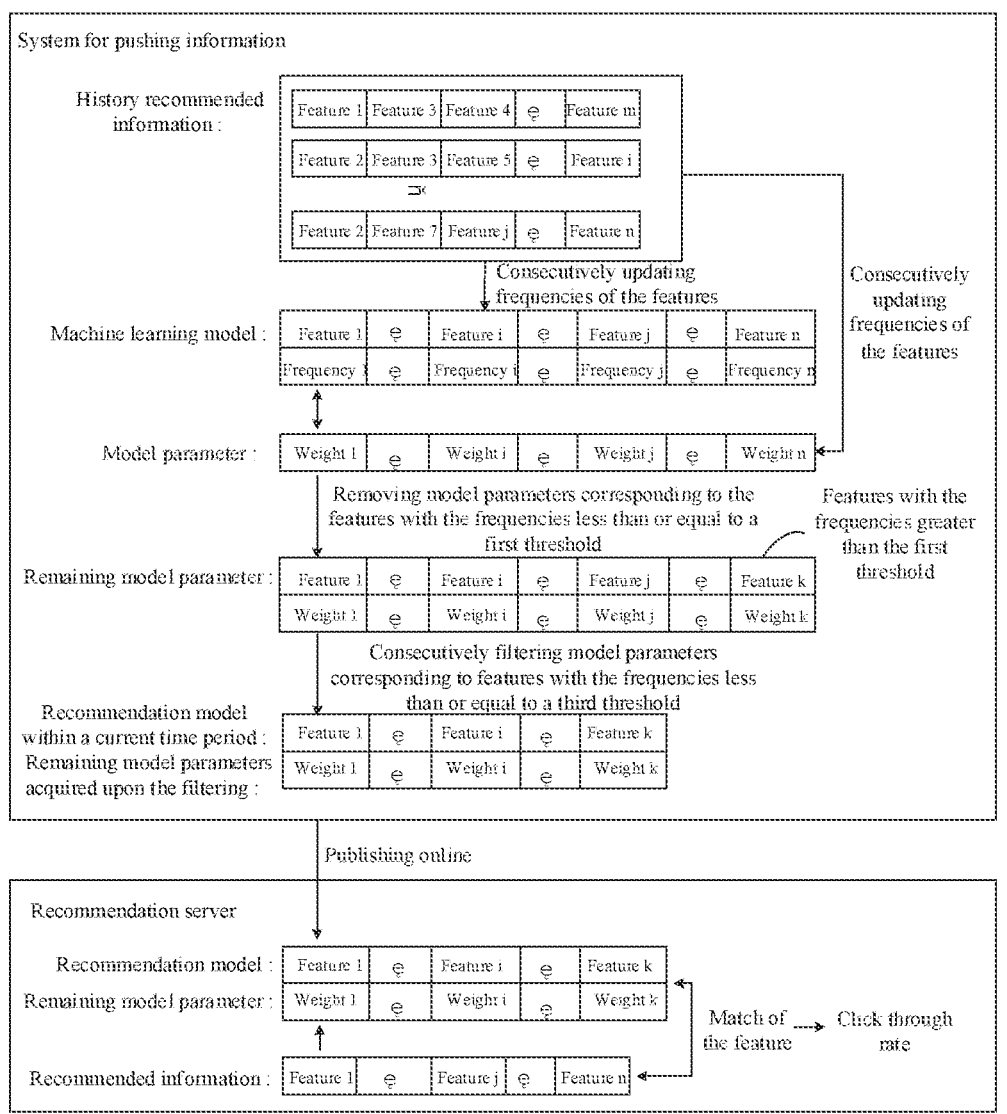
FIG. 3B is a schematic diagram of a principle of training a recommendation model in another method for recommending information according to an embodiment of the present disclosure.

FIG. 3A is a flowchart of training a recommendation model in another method for recommending information according to an embodiment of the present disclosure, and FIG. 3B is a schematic diagram of a principle of training a recommendation model in another method for recommending information according to an embodiment of the present disclosure. This embodiment is refined based on the embodiment described above. Upon completion of the training of the machine learning model, the prediction of the model may be congested in the case that the model scale reaches the memory limit, Therefore, the model parameters corresponding to the features with lower frequencies need to be further filtered to ensure the efficiency of the recommendation model. This embodiment primarily illustrates the further optimization process of the recommendation model.

As shown in FIG. 3A, the method may include processes S310 to S340.

In S310, model parameters corresponding to features with frequencies greater than a first threshold in a machine learning model are sequentially updated based on a click through rate of a history feature vector of a history recommended information in a preset machine learning model.

In S320, remaining model parameters are acquired by removing model parameters corresponding to features with frequencies less than or equal to the first threshold upon completion of the training of machine learning model, and in the case that the machine learning model scale reaches a memory limit, the model parameters corresponding to the features with the frequencies less than or equal to a second threshold in the remaining model parameters is filtered, and the recommendation model is generated based on the filtered remaining model parameters acquired upon the filtering.

Illustratively, upon completion of the training of the machine learning model, the model parameters corresponding to the features with the frequencies less than or equal to the first threshold in the machine learning model may be removed. In the case that the machine learning model scale reaches the memory limit, the model parameters corresponding to the features with the frequencies less than or equal to a second threshold are filtered from the remaining model parameters upon the removal of the model parameters corresponding to features with frequencies less than or equal to the first threshold. In this case, the second threshold is greater than the first threshold, and the corresponding memory is released. The corresponding recommendation model is generated based on the filtered remaining model parameters acquired upon the filtering, thereby reducing the size of the recommendation model.

In S330, upon completion of the training of the machine learning model within a current time period, the frequencies of the different features in the machine learning model are updated by a preset frequency attenuation coefficient, the model parameters corresponding to a features with frequencies less than or equal to a third threshold are filtered from the remaining model parameters upon the removal of the model parameters corresponding to features with frequencies less than or equal to the first threshold, and the recommendation model is generated based on the remaining model parameters acquired upon the filtering within the current time period.

Illustratively, as new recommended services are coming out in the information recommendation process, new features are constantly emerging. Where the features of the recommended service updated within a time period are merely popular within the period of time, the features of the service are no longer referred later. However, the features of the service are still referred in the latter training as the machine learning model has recorded that the frequencies of the features of the service are greater than the first threshold within the period of time, although the features of the service have no contribution to the training of the model. Therefore, to ensure the accuracy of the recommendation model, in this embodiment, the machine learning model may be trained by time division, the history recommended information is acquired within the current time period, and the model parameters corresponding to the features with the frequencies greater than the first threshold in the machine learning model are consecutively modified. Upon completion of the training of the machine learning model within the current time period, as features within the previous time period may be not present, the frequencies of the different features in the machine learning model are updated by the preset frequency attenuation coefficient, Where the features are not present all along, the frequencies of the features may be constantly attenuated until the features with frequencies less than or equal to the third threshold is removed. As shown in FIG. 3B, the model parameters corresponding to the features with the frequencies less than or equal to the first threshold are first removed in this embodiment to acquire the remaining model parameters. Then, the frequencies of the different features in the machine learning model are updated by the preset frequency attenuation coefficient, and the model parameters corresponding to the features with the frequencies less than or equal to the third threshold are further filtered from the remaining model parameters, thereby generating the recommendation model based on the filtered remaining model parameters acquired upon the filtering within a current time period, and improving the accuracy and efficiency of the recommendation model.

It is to be noted that, in this embodiment, the model parameters corresponding to the features with the frequencies less than or equal to the third threshold may be determined whether to filter based on the scale of the trained machine learning model. In the case that the scale of the machine learning model upon completion of the training within the current time period does not reach the memory limit, the model parameters corresponding to the features with the frequencies less than or equal to the third threshold may not be further filtered, and the corresponding recommendation model is generated directly based on the remaining model parameters upon the removal of the model parameters corresponding to the features with the frequencies less than or equal to the first threshold. S320 or S330 in this embodiment may be selectively performed.

In S340, the recommendation model is published online.

In the technical solution according to this embodiment, upon completion of the training of the machine learning model, in the case that the machine learning model scale reaches the memory limit, the model parameters corresponding to the features with the frequencies less than or equal to a second threshold are filtered from the remaining model parameters upon the removal of the model parameters corresponding to features with frequencies less than or equal to the first threshold. The corresponding recommendation model is generated based on the filtered remaining model parameters acquired upon the filtering, thereby reducing the size of the recommendation model, reducing the occupied memory of the model parameters and the high dimensional sparse feature. In addition, the machine learning model may be trained by time division, and the frequencies of the different features are consecutively updated by the frequency attenuation coefficient, so as to ensure the accuracy and efficiency of the recommendation model at different periods. FIG. 4 is a flowchart of yet another method for recommending information according to an embodiment of the present disclosure. This embodiment is refined based on the embodiment described above. The specific information recommendation process is described in this embodiment. As shown in FIG. 4, this embodiment may include processes S410 to S430.

In S410, the remaining model parameters are acquired from the recommendation model upon the removal of the model parameters corresponding to the features that are the same as the features of the feature vector and have the frequencies less than or equal to the first threshold.

Illustratively, upon acquisition of a large amount of recommended information based on the request of the user, the feature vector of each recommended information needs to be predicted by a recommendation model published online. Therefore, the recommendation model published online is first determined, and the remaining model parameters upon the removal of the model parameters corresponding to the features that the same as the features of the feature vector and have the frequencies less than or equal to the first threshold, that is, the model parameters corresponding to features with the frequencies greater than the first threshold, are looked up in the recommendation model, so as to analyze corresponding features in the feature vector of each recommended information.

In S420, the click through rate of the recommended information is calculated based on the remaining model parameters and features corresponding to the remaining model parameters in the feature vector.

Illustratively, the features corresponding to the remaining model parameters are filtered from the feature vector of each recommended information based on the remaining model parameters remaining in the recommendation model. In this case, the model parameters may be a weight coefficient of the feature. Each remaining model parameters and the features corresponding to the remaining model parameters in the feature vector of the recommended information are multiplied and summed in a weighted sum fashion, and the weighted sum result of the features corresponding to the remaining model parameters in the feature vector of the recommended information are acted as the click through rate of the recommended information in this embodiment, thereby reducing the amount of computation in the recommendation model and improving the efficiency of the information recommendation.

In S430, the recommended information is ranked based on the click through rate, and a corresponding issue list is created to issue the recommended information to the user.

Illustratively, upon acquisition of the click through rate of a plurality of recommended information, the plurality of recommended information are ranked based on the order of the click through rate. The top recommended information is selected based on the requirement of the user to create a corresponding issue list, and the issue list is shown to the user to ensure the accuracy of the information recommendation.

In the technical solution according to this embodiment, in the process of training the recommendation model, the model parameters corresponding to features that are the same as the features in the feature vector of the recommended information and have the frequencies less than or equal to the first threshold are removed, and the model parameters corresponding to the features with the frequencies greater than the first threshold are remained, thereby reducing the size of the recommendation model and the occupied memory of the parameters in the recommendation model. In addition, in the case that the feature vector of the recommended information is predicted based on the model parameters in the recommendation model, not all the model parameters that correspond to the features in the feature vector are required to look up, thereby reducing the time spent in the lookup process. The features in the feature vector of the recommended information that correspond to the model parameters remained in the recommendation model are analyzed, which improves the accuracy and efficiency of information recommendation, pushes more quality content for the user, and improves the information push effect.

FIG. 5 is a schematic structural diagram of an apparatus for recommending information according to an embodiment of the present disclosure. As Shown in FIG. 5, the apparatus includes:

a click predicting module 510, configured to acquire a click through rate of recommended information by predicting a feature vector of the recommended information by a recommendation model, wherein model parameters corresponding to features that are the same as features of the feature vector and have frequencies less than or equal to a first threshold are removed from the recommendation model;

an information recommending module 520, configured to issue the recommended information based on the click through rate.

In the technical solution according to this embodiment, in the process of training the recommendation model, the model parameters corresponding to features that are the same as the features in the feature vector of the recommended information and have the frequencies less than or equal to the first threshold are removed, and the model parameters corresponding to the features with the frequencies greater than the first threshold are remained, thereby reducing the size of the recommendation mode and the occupied memory of the parameters in the recommendation model. In addition, in the case that the feature vector of the recommended information is predicted based on the model parameters in the recommendation model, not all the mode parameters that correspond to the features in the feature vector are required to look up, thereby reducing the time spent in the lookup process. The features in the feature vector of the recommended information that correspond to the model parameters remained in the recommendation model are analyzed, which improves the accuracy and efficiency of information recommendation.

In an embodiment, the click predicting module 510 may be configured to:

acquire remaining model parameters from the recommendation model upon the removal of the model parameters corresponding to the features that are the same as the features of the feature vector and have the frequencies less than or equal to the first threshold; and calculate the click through rate of the recommended information based on the remaining model parameters and features corresponding to the remaining model parameters in the feature vector.

In an embodiment, the information recommendation model may be generated operations performed by a model parameter updating module and a recommendation model generating module in a model training system.

A model parameter updating module configured to sequentially update the model parameters corresponding to the features with the frequencies greater than the first threshold in the machine learning model based on the click through rate of the history feature vector of the history recommended information in the preset machine learning model.

A recommendation model generating module configured to acquire the remaining model parameters by removing model parameters corresponding to features with frequencies less than or equal to the first threshold upon completion of the training of the machine learning model, and generate the recommendation model based on the remaining model parameters, wherein the remaining model parameters is model parameters corresponding to the features with the frequencies less than the first threshold in the machine learning model.

In an embodiment, the model parameter updating module may be configured to:

acquire a corresponding current click through rate by predicting the history feature vector of the current history recommended information by the machine learning model; and calculate a loss coefficient of the current click through rate at the model parameters corresponding to the features with the frequencies greater than the first threshold by the loss function, modify the corresponding model parameters in the machine learning model by the loss coefficient, predict the history feature vector of the next history recommended information by the machine learning model, and modify the model parameters corresponding to the features with the frequencies greater than the first threshold in the machine learning model until training of the machine learning model is completed.

In an embodiment, the system for training the model described above may further include:

a sparse parameter setting module, configured to set the model parameters corresponding to the features with the frequencies less than or equal to the first threshold in the machine learning model as preset sparsity values to remove the model parameters set as the preset sparsity values upon completion of the training of the machine learning model.

In an embodiment, the recommendation model generating module may be configured to:

filter, in the case that the machine learning model scale reaches a memory limit, the model parameters corresponding to the features with the frequencies less than or equal to a second threshold from the remaining model parameters, and generate the recommendation model based on the remaining model parameters acquired upon the filtering, wherein the second threshold is greater than the first threshold.

In an embodiment, the recommendation model generating module may be further configured to:

upon completion of the training of the machine learning model within a current time period, update the frequencies of the different features in the machine learning model by a preset frequency attenuation coefficient, filter the model parameters corresponding to features with frequencies less than or equal to a third threshold from the remaining model parameters upon the removal of the model parameters corresponding to features with frequencies less than or equal to the first threshold, and generate the recommendation model based on the filtered remaining model parameters acquired upon the filtering within a current time period.

In an embodiment, the system for training the model described above may further include:

a model publishing module configured to publish the recommendation model online.

In an embodiment, the model parameters are weight coefficients of different features in the recommendation model.

In an embodiment, the information recommendation module 520 pray be configured to:

rank the recommended information based on the click through rate, and create a corresponding issue list to issue the recommended information to a user.

The apparatus for recommending information according to this embodiment is applicable to the methods for recommending information according to any of the embodiments described above.

Figure 6:
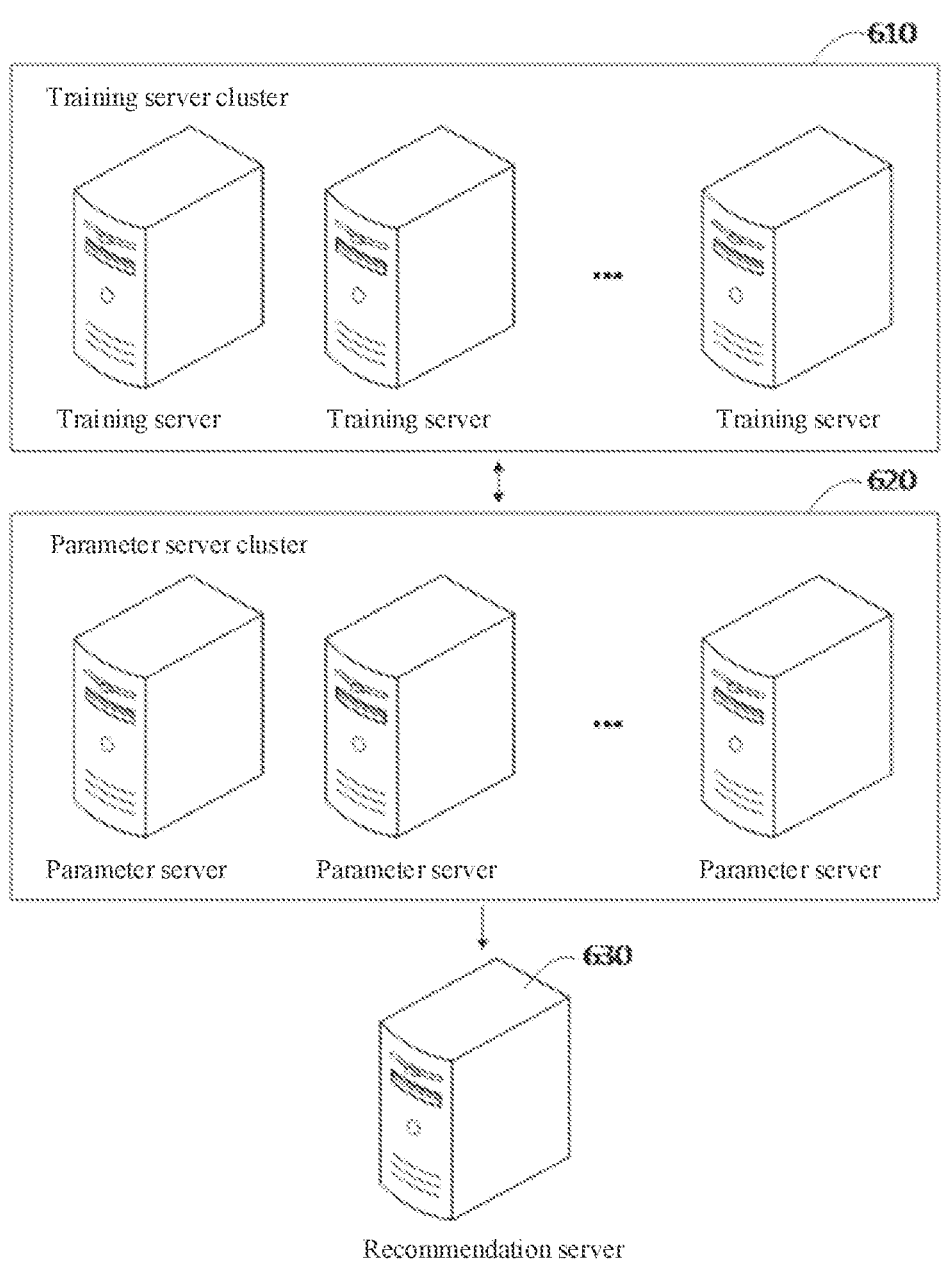
FIG. 6 is a schematic architectural diagram of a system for training a model according to an embodiment of the present disclosure.

FIG. 6 is a schematic architectural diagram of a system for training a model according to an embodiment, of the present disclosure. This embodiment is refined based on the embodiments described above. Referring to FIG. 6, the system for training the model may include a training server cluster 610 and a parameter server cluster 620, wherein the parameter server cluster is configured to store model parameters corresponding to different features in the preset machine learning model.

Illustratively, the training server cluster 610 is configured to sequentially acquire latest model parameters corresponding to the different features in the machine learning model from the parameter server cluster 620, acquire a corresponding click through rate by processing a history feature vector of history recommended information based on the model parameter, calculate a loss coefficient of the model parameters corresponding to the features with the frequencies greater than a first threshold in the machine learning model, and return the loss coefficient to the parameter server cluster 620; and the parameter server cluster 620 is further configured to update the corresponding model parameters by the loss coefficient and feed the updated model parameters back to the training server cluster 610, remove model parameters corresponding to features with frequencies less than or equal to the first threshold upon completion of the training of the machine learning model, acquire remaining model parameters, and generate a corresponding recommendation model based on the remaining model parameters.

The training server cluster 610 is further configured to set the model parameters corresponding to the features with the frequencies less than or equal to the first threshold in the machine learning model as the preset sparsity values, and return the preset sparsity values to return to the parameter server cluster 620; the parameter server cluster 620 is further configured to modify the model parameters corresponding to the features with the frequencies less than or equal to the first threshold in the machine learning model as the preset sparsity values, and remove the model parameters set as the preset sparse values upon completion of the training of the machine learning model.

In an embodiment, to ensure the efficiency of the model, upon completion of the training of the machine learning model, the parameter server cluster 620 is further configured to filter, in the case that the machine learning model scale reaches a memory limit, the model parameters corresponding to the features with the frequencies less than or equal to a second threshold from the remaining model parameters, and generate the recommendation model based on the remaining model parameters acquired upon the filtering, wherein the second threshold is greater than the first threshold.

Illustratively, to ensure the accuracy of the recommendation model within each period, upon completion of the training of the machine learning model within a current time period, the parameter server cluster 620 is configured to update the frequencies of the different features in the machine learning model by the preset frequency attenuation coefficient, filter the model parameters corresponding to the features with frequencies less than or equal to a third threshold from the remaining model parameters upon the removal of the model parameters corresponding to features with frequencies less than or equal to the first threshold, and generate the recommendation model based on the filtered remaining model parameters acquired upon the filtering within a current time period.

In addition, the system for training the model may further include a recommendation server 630, the parameter server cluster 620 is configured to publish the generated recommendation model to the recommendation server 630, and the recommendation server 630 is configured to perform the method for recommending information in any of the embodiments of the present disclosure.

It is noted that, the training server cluster 610 includes of a plurality of training servers in a distributed deployment fashion, and the training server can perform training of the machine learning model in parallel, thereby increasing the training rate of the model. The parameter server cluster 620 includes of a plurality of in a distributed deployment fashion, and the parameter server is configured to store the model parameters corresponding to different features in the machine learning model in a partitioned fashion to relieve the storage pressure of the data. In addition, the training processes and the parameter modification processes in the process of training the model are separated to relieving the computational pressure of the model training.

In the technical solution according to this embodiment, the recommendation model is trained by training server cluster and the parameter server cluster, such that the training processes and the parameter update processes are separated, and the training and model parameters are spread onto different computing nodes. Therefore, the computational pressure of the single server is relieved, and the training rate of the recommendation model is improved.

Figure 7:
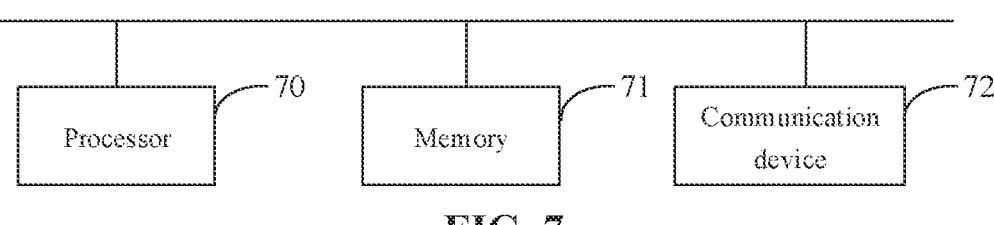
FIG. 7 is a schematic structural diagram of a recommendation server according to an embodiment of the present disclosure.

FIG. 7 is a schematic structural diagram of a recommendation server according to an embodiment of the present disclosure. As shown in FIG. 7, the recommendation server includes a processor 70, a memory 71, and a communication device 72, At least one processor 70 may be configured in the recommendation server, and FIG. 7 uses one processor 70 as an example for illustration. The processor 70, the memory 71, and the communication device 72 in the recommendation server may be connected by a bus or other means, and the connection by the bus is taken as an example in FIG. 7.

The memory 1, as a computer-readable, storage medium, may be configured to store a software program, a computer-executable program, and a module, such as the program instructions modules corresponding to method for recommending information in any one of the embodiments. The processor 70 achieves various functional applications and data processing of the recommendation server, i.e., performs above method for recommending information, by executing the software program, the instruction, and the module stored in the memory 71.

The memory 71 may primarily include a storage program region and a storage data region. The storage program region may store an operation system and an application for at least one function, and the storage data region may store data created based on the use of the terminal, and the like. Furthermore, the memory 71 may include a high-speed random access memory, and a non-volatile memory, such as at least one magnetic disk, flash memory, or other non-volatile solid state storage device. In some examples, the memory 71 may include a memory remotely disposed relative to the processor 70, which may be connected to the recommendation server over a network. Examples of the network include, but are not limited to, the Internet, the intranet, a local area network, a mobile communication network, and any combinations thereof.

The communication device 72 may be configured to achieve a network connection or a mobile data connection between the recommendation server and the client.

The recommendation server according to this embodiment may be configured to perform the method for recommending information in any one of the embodiments described above.

An embodiment of the present disclosure also provides a computer-readable storage medium. The computer program, when loaded and run by a processor, causes the server to perform the method for recommending information in any one of the embodiments described above. The method may include:

acquiring a click through rate of recommended information by predicting a feature vector of the recommended information by a recommendation model, wherein model parameters corresponding to features that are the same as features of the feature vector and have frequencies less than or equal to a first threshold is removed from the recommendation model; and issuing the recommended information based on the click through rate.

For the storage medium including computer-executable instructions according to this embodiment of the present disclosure, the computer-executable instructions are not limited to the method operations described above, and may further perform related operations in the method for recommending information in any one of the embodiments of the present disclosure.

It should be apparent to those skilled in the art from the foregoing description of the embodiments that, the present disclosure may be implemented by software and the necessary general purpose hardware, and may be implemented by hardware, and the former is a preferable implementation, Based on such understandings, the essence of the technical solution of the present disclosure or the portion contributed to the related art may be embodied in the form of a software product. The computer software product may be stored in a computer-readable storage medium, for example, a floppy disk, a read-only memory (ROM), a random-access memory (RAM), a flash memory (FLASH), a hard disk, or an optical disk of a computer, and the like. The computer software product includes a plurality of instructions to cause the computer device (a personal computer, a server, or a network device) to perform the method described above.

It should be noted that, in the above embodiments of the apparatus for recommending information, the included units and modules are merely divided according to function logic, but are not limited to the division described above, so long as the corresponding functions can be implemented. In addition, the names of the functional units are also merely for distinction, and are not intended to limit the scope of the present disclosure.

What is claimed is:

1. A method for recommending information, executed by a recommendation server, and comprising:

acquiring a click through rate of recommended information by predicting a feature vector of the recommended information by a recommendation model, wherein model parameters corresponding to features that are the same as features of the feature vector and have frequencies less than or equal to a first threshold are removed from the recommendation model; and issuing the recommended information based on the click through rate, wherein the recommended information is data content corresponding to a current issue request and is looked up by the recommendation server based on a received issue from a client;

wherein the recommendation model is generated by a system for training the recommendation model through performing:

sequentially updating model parameters corresponding to features with frequencies greater than the first threshold in a machine learning model based on the click through rate of a history feature vector of history recommended information in a preset machine learning model, wherein each of the features in the history feature vector of history recommended information in the machine learning model is preset initial values of model parameters corresponding to features, and a frequency of each of the features in the machine learning model is updated using a preset frequency attenuation coefficient upon completion of the training of the machine learning model; and removing model parameters corresponding to features with frequencies less than or equal to the first threshold upon completion of the training of the machine learning model, and generating the recommendation model based on latest remaining model parameters, wherein the remaining model parameters are model parameters corresponding to the features with the frequencies greater than the first threshold in the machine learning model;

wherein generating the recommendation model based on the latest remaining model parameters comprises:

in response to a machine learning model scale reaching a memory limit, filtering model parameters corresponding to features with frequencies less than or equal to a second threshold from the remaining model parameters, and generating the recommendation model based on remaining model parameters acquired upon the filtering, wherein the second threshold is greater than the first threshold.

2. The method according to claim 1, wherein acquiring the click through rate of the recommended information by predicting the feature vector of the recommended information by the recommendation model comprises:

acquiring remaining model parameters from the recommendation model upon the removal of the model parameters corresponding to the features that are the same as the features of the feature vector and have the frequencies less than or equal to the first threshold; and calculating the click through rate of the recommended information based on the remaining model parameters and features corresponding to the remaining model parameters in the feature vector.

3. The method according to claim 1, wherein sequentially updating the model parameters corresponding to the features with the frequencies greater than the first threshold in the machine learning model based on the click through rate of the history feature vector of the history recommended information in the preset machine learning model comprises:

acquiring a corresponding current click through rate by predicting a history feature vector of current history recommended information by the machine learning model; and calculating a loss coefficient of the current click through rate at the model parameters corresponding to the features with the frequencies greater than the first threshold by a preset loss function, modifying the corresponding model parameters in the machine learning model by the loss coefficient, predicting a history feature vector of next history recommended information by the machine learning model, and modifying the model parameters corresponding to the features with the frequencies greater than the first threshold in the machine learning model until the training of the machine learning model is completed.

4. The method according to claim 1, wherein upon sequentially updating the model parameters corresponding to the features with the frequencies greater than the first threshold in the machine learning model, the method further comprises:

setting the model parameters corresponding to the features with the frequencies less than or equal to the first threshold in the machine learning model as preset sparsity values to remove the model parameters set as the preset sparsity values upon completion of the training of the machine learning model.

5. The method according to claim 1, wherein removing the model parameters corresponding to the features with the frequencies less than or equal to the first threshold upon completion of the training of the machine learning model, and generating the recommendation model based on the remaining model parameters comprise:

upon completion of the training of the machine learning model within a current time period, updating the frequencies of different features in the machine learning model by the preset frequency attenuation coefficient, filtering model parameters corresponding to features with frequencies less than or equal to a third threshold from the remaining model parameters upon the removal of the model parameters corresponding to the features with the frequencies less than or equal to the first threshold, and generating the recommendation model based on remaining model parameters acquired upon the filtering within the current time period.

6. The method according to claim 1, wherein upon generating the recommendation model based on the latest remaining model parameters, the method further comprises:

publishing the recommendation model online.

7. The method according to claim 1, wherein the model parameter is a weight coefficient of different features in the recommendation model.

8. The method according to claim 1, wherein issuing the recommended information based on the click through rate comprises:

ranking the recommended information based on the click through rate, and creating a corresponding issue list to issue the recommended information to a user.

9. A recommendation server for recommending information, comprising:

one or more processors; and a memory configured to store one or more programs;

wherein the one or more programs, when loaded and run by the one or more processors, causes the one or more processors to perform a method for recommending information comprising:

acquiring a click through rate of recommended information by predicting a feature vector of the recommended information by a recommendation model, wherein model parameters corresponding to features that are the same as features of the feature vector and have frequencies less than or equal to a first threshold are removed from the recommendation model; and issuing the recommended information based on the click through rate, wherein the recommended information is data content corresponding to a current issue request and is looked up by the recommendation server based on a received issue from a client;

wherein the recommendation model is generated by a system for training the model through performing:

sequentially updating model parameters corresponding to features with frequencies greater than the first threshold in a machine learning model based on the click through rate of a history feature vector of history recommended information in a preset machine learning model, wherein each of the features in the history feature vector of history recommended information in the machine learning model is preset initial values of model parameters corresponding to features, and a frequency of each of the features in the machine learning model is updated using a preset frequency attenuation coefficient upon completion of the training of the machine learning model; and removing model parameters corresponding to features with frequencies less than or equal to the first threshold upon completion of the training of the machine learning model, and generating the recommendation model based on latest remaining model parameters, wherein the remaining model parameters are model parameters corresponding to the features with the frequencies greater than the first threshold in the machine learning model;

wherein generating the recommendation model based on the latest remaining model parameters comprises:

in response to a machine learning model scale reaching a memory limit, filtering model parameters corresponding to features with frequencies less than or equal to a second threshold from the remaining model parameters, and generating the recommendation model based on remaining model parameters acquired upon the filtering, wherein the second threshold is greater than the first threshold.

10. A system for training a model, comprising a training server cluster, a parameter server cluster and a recommendation server, wherein the parameter server cluster is configured to store model parameters corresponding to different features in a preset machine learning model, wherein each of the features in a history feature vector of history recommended information in the machine learning model is preset initial values of model parameters corresponding to features;

the training server cluster is configured to sequentially acquire latest model parameters corresponding to different features in the machine learning model from the parameter server cluster, acquire a corresponding click through rate by processing the history feature vector of history recommended information based on the model parameter, calculate a loss coefficient of model parameters corresponding to features with frequencies greater than a first threshold in the machine learning model, and return the loss coefficient to the parameter server cluster;

the parameter server cluster is further configured to update the corresponding model parameters by the loss coefficient and feed the updated model parameters back to the training server cluster, remove model parameters corresponding to features with frequencies less than or equal to the first threshold upon completion of the training of the machine learning model, and generate a corresponding recommendation model based on the remaining model parameters, wherein a frequency of each of the features in the machine learning model is updated using a preset frequency attenuation coefficient upon completion of the training of the machine learning model; and the recommendation server is configured to perform the method for recommending information as defined in claim 1.

11. The system according to claim 10, wherein the training server cluster is further configured to set the model parameters corresponding to the features with the frequencies less than or equal to the first threshold in the machine learning model as preset sparsity values, and return the preset sparsity values to the parameter server cluster; and the parameter server cluster is further configured to modify the model parameters corresponding to the features with the frequencies less than or equal to the first threshold in the machine learning model as the preset sparsity values, and remove the model parameters set as the preset sparse values upon completion of the training of the machine learning model.

12. The system according to claim 10, wherein upon completion of the training of the machine learning model within a current time period, the parameter server cluster is further configured to update the frequencies of the different features in the machine learning model by a preset frequency attenuation coefficient, filter model parameters corresponding to features with frequencies less than or equal to a third threshold from the remaining model parameters upon the removal of the model parameters corresponding to the features with the frequencies less than or equal to the first threshold, and generates the recommendation model based on the remaining model parameters acquired upon the filtering within a current time period.

13. The system according to claim 10, wherein the parameter server cluster is further configured to publish the generated recommendation model to the recommendation server, and wherein the recommendation server comprises:

one or more processors; and a memory configured to store one or more programs configured to execute the method for recommending information.

14. A non-volatile computer-readable storage medium, storing a computer program; wherein the computer program, when loaded and run by a processor, causes a server to perform the method for recommending information as defined in claim 1.

15. The recommendation server according to claim 9, wherein acquiring the click through rate of the recommended information by predicting the feature vector of the recommended information by the recommendation model comprises:

acquiring remaining model parameters from the recommendation model upon the removal of the model parameters corresponding to the features that are the same as the features of the feature vector and have the frequencies less than or equal to the first threshold; and calculating the click through rate of the recommended information based on the remaining model parameters and features corresponding to the remaining model parameters in the feature vector.

16. The recommendation server according to claim 9, wherein sequentially updating the model parameters corresponding to the features with the frequencies greater than the first threshold in the machine learning model based on the click through rate of the history feature vector of the history recommended information in the preset machine learning model comprises:

acquiring a corresponding current click through rate by predicting a history feature vector of current history recommended information by the machine learning model; and calculating a loss coefficient of the current click through rate at the model parameters corresponding to the features with the frequencies greater than the first threshold by a preset loss function, modifying the corresponding model parameters in the machine learning model by the loss coefficient, predicting a history feature vector of next history recommended information by the machine learning model, and modifying the model parameters corresponding to the features with the frequencies greater than the first threshold in the machine learning model until training of the machine learning model is completed.

17. The recommendation server according to claim 9, wherein upon sequentially updating the model parameters corresponding to the features with the frequencies greater than the first threshold in the machine learning model, the method further comprises:

setting the model parameters corresponding to the features with the frequencies less than or equal to the first threshold in the machine learning model as preset sparsity values to remove the model parameters of the preset sparsity values upon completion of training of the machine learning model.

* * * * *